United States Patent
Szadkowski et al.

(10) Patent No.: US 6,805,228 B2
(45) Date of Patent: Oct. 19, 2004

(54) CLUTCH LEVER WITH VARIABLE LEVER RATIO

(75) Inventors: Andrzej Szadkowski, Southern Pines, NC (US); Ronald B. Morford, Southern Pines, NC (US); Muneer Abusamra, Southern Pines, NC (US)

(73) Assignee: ZF Sachs AG, Schweinfurt (DE)

( * ) Notice: Subject to any disclaimer, the term of this patent is extended or adjusted under 35 U.S.C. 154(b) by 0 days.

(21) Appl. No.: 09/950,103

(22) Filed: Sep. 10, 2001

(65) Prior Publication Data

US 2003/0047405 A1 Mar. 13, 2003

(51) Int. Cl.[7] .......................... F16D 13/42; G05G 1/21; G05G 7/12
(52) U.S. Cl. .......................... 192/70.3; 74/516; 74/518; 74/522; 192/99 A
(58) Field of Search .................. 192/70.29, 70.3, 192/70.27, 110 R, 84.24, 99 A, 52.4, 70.13, 70.25; 74/516, 518, 519, 522

(56) References Cited

U.S. PATENT DOCUMENTS

| | | | |
|---|---|---|---|
| 1,655,169 A | * | 1/1928 | Taub .......................... 192/70.3 |
| 1,965,325 A | * | 7/1934 | Tower ........................ 192/110 B |
| 3,276,555 A | * | 10/1966 | Phelps et al. .............. 192/70.27 |
| 3,667,582 A | * | 6/1972 | Borck et al. .............. 192/70.29 |
| 4,662,498 A | * | 5/1987 | Yanko ........................ 192/110 R |
| 4,754,860 A | * | 7/1988 | Fukutake et al. .......... 192/70.3 |
| 4,793,456 A | * | 12/1988 | Kummer et al. ........... 192/70.3 |
| 5,979,629 A | * | 11/1999 | Asada et al. ............... 192/70.3 |
| 6,394,254 B1 | * | 5/2002 | Ijames ....................... 192/70.29 |

* cited by examiner

Primary Examiner—Rodney H. Bonck
(74) Attorney, Agent, or Firm—Cohen, Pontani, Lieberman & Pavane

(57) ABSTRACT

A plurality of clutch levers transmit force to a pressure plate of a clutch. The lever ratio of the clutch lever is variable as the clutch lever moves from an engaged to a disengaged state. When the clutch is engaged, the clutch lever presses the pressure plate to engage clutch discs. The lever ratio of the clutch lever is relatively large, allowing for an acceptable clamp load. When the clutch is disengaged, the clutch lever lifts from the pressure plate, disengaging the pressure plate from the clutch discs. When the clutch is disengaged, the lever ratio is relatively small, allowing for more clearance between the pressure plate and the flywheel and an increase in pressure plate lift. By using a clutch lever having a variable lever ratio, both clamp load and clutch lift can be maximized. The conditions exist during the entire lift of the clutch.

24 Claims, 3 Drawing Sheets

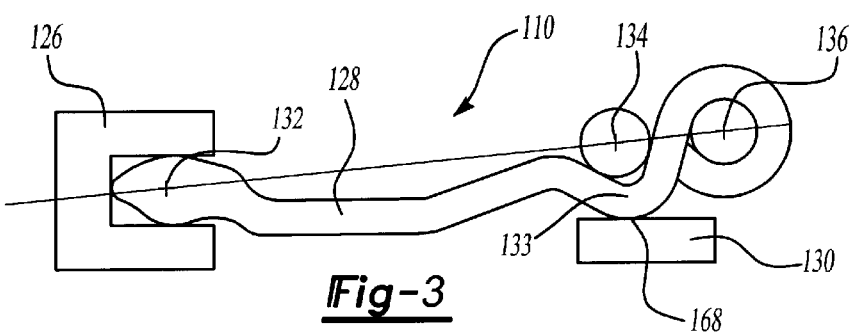
Fig-3
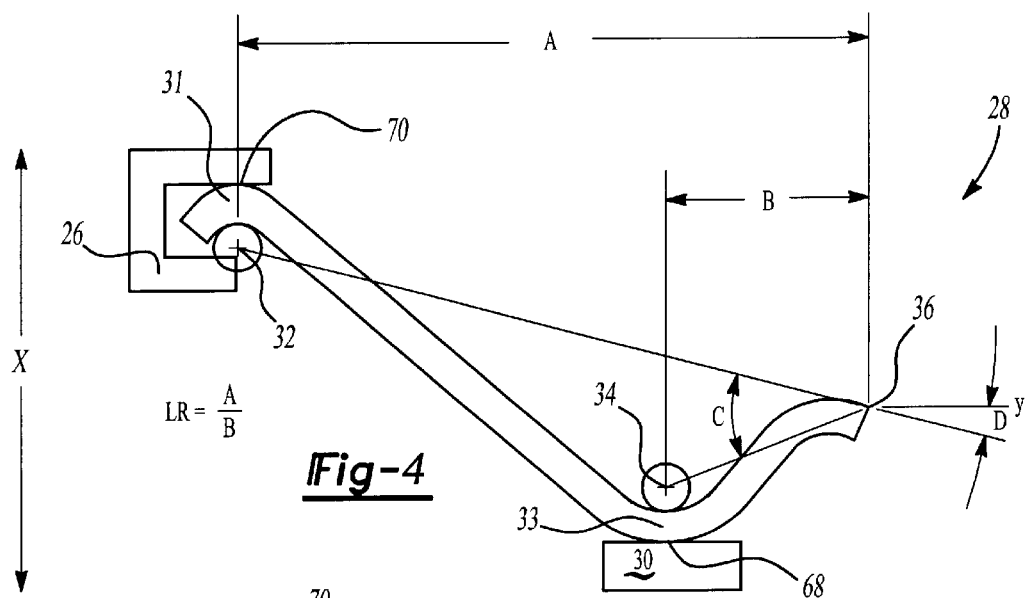
Fig-4 $LR = \dfrac{A}{B}$
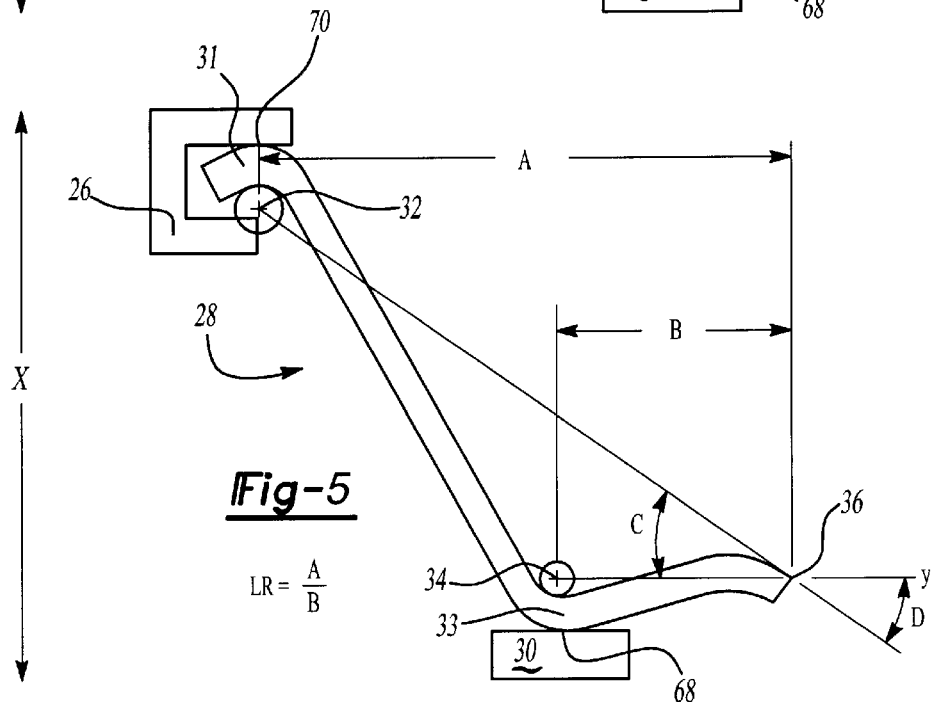
Fig-5 $LR = \dfrac{A}{B}$

CLUTCH LEVER WITH VARIABLE LEVER RATIO

BACKGROUND OF THE INVENTION

The present invention relates generally to a clutch lever with a lever ratio that varies during movement of the clutch lever to maximize both clamp load and clutch lift.

A clutch is utilized to selectively transmit rotation between a drive engine and a transmission. When the clutch is engaged, the clutch lever presses a pressure plate to engage adjacent clutch discs, transmitting rotation between the engine and the transmission. When the clutch is disengaged, the clutch lever is lifted from the pressure plate, releasing the pressure plate from the clutch discs and allowing the clutch discs to rotate relative to the flywheel and the clutch cover, disengaging the engine from the transmission.

The clutch lever provides a force to the pressure plate which is proportional to the lever ratio. A proper lever ratio selection of the clutch lever is important for good clutch performance. In prior clutch assemblies, the clutch lever is usually designated to produce a constant lever ratio.

It is important that the lever ratio be large enough to transmit torque and create an acceptable clamp load level. However, if the lever ratio is large, the pressure plate lift decreases as there is less clearance, or clutch lift, between the pressure plate and the flywheel. For this reason, if the lever ratio is too large, the probability of clutch drag increases. Generally, optimizing clamp load is prioritized over clutch lift, but these competing factors do limit the design of clutches.

Hence, there is a need in the art for a clutch lever with a variable lever ratio to maximize both clamp load and clutch lift.

SUMMARY OF THE INVENTION

The present invention relates to a clutch lever with a lever ratio that varies during movement of the clutch lever to maximize both clamp load and clutch lift.

A plurality of clutch levers in a clutch transmit rotation between an engine and a transmission. Each clutch lever includes an inner portion received in an axially moving retainer, an intermediate portion contacting the pressure plate, and a pivoting outer point. A center of curvature of the intermediate fulcrum contact is positioned on the same level as the point of contact of the intermediate portion and the pressure plate, and a center of curvature of the inner fulcrum contact is positioned on the same level as the point of contact of the inner portion and the retainer.

The lever shape is defined by the angle formed by lines extending from the outer point to the intermediate center of curvature and from the outer point to the inner center of curvature. The clutch levers provide force to the pressure plate which is proportional to a lever ratio. The lever ratio is defined by the radial distance from the inner center of curvature to the outer point divided by the radial distance from the intermediate center of curvature to the outer point.

As the clutch levers have the outer point, the intermediate center of curvature and the inner center of curvatures non co-linear, the lever ratio changes as the lever position changes. The clutch levers are designed such that as the clutch levers move from an engaged position to a disengaged position, the lever ratio decreases. As the lever ratio is variable, it is possible to improve both clamp load and clutch lift by selecting the lever shape and changing the lever position. When the clutch is engaged, the lever ratio is large, allowing for large clamp load. When the clutch is disengaged, the lever ratio is small, allowing for large clutch lift.

Accordingly, the present invention provides a clutch lever with a lever ratio that varies during movement of the clutch lever to maximize both clamp load and clutch lift.

These and other features of the present invention will be best understood from the following specification and drawings.

BRIEF DESCRIPTION OF THE DRAWINGS

The various features and advantages of the invention will become apparent to those skilled in the art from the following detailed description of the currently preferred embodiment. The drawings that accompany the detailed description can be briefly described as follows:

FIG. 3 illustrates a prior art clutch lever;

FIG. 4 illustrates the clutch lever in the engaged position; and

FIG. 5 illustrates the clutch lever in the disengaged position.

DETAILED DESCRIPTION OF THE PREFERRED EMBODIMENT

Figure 1:
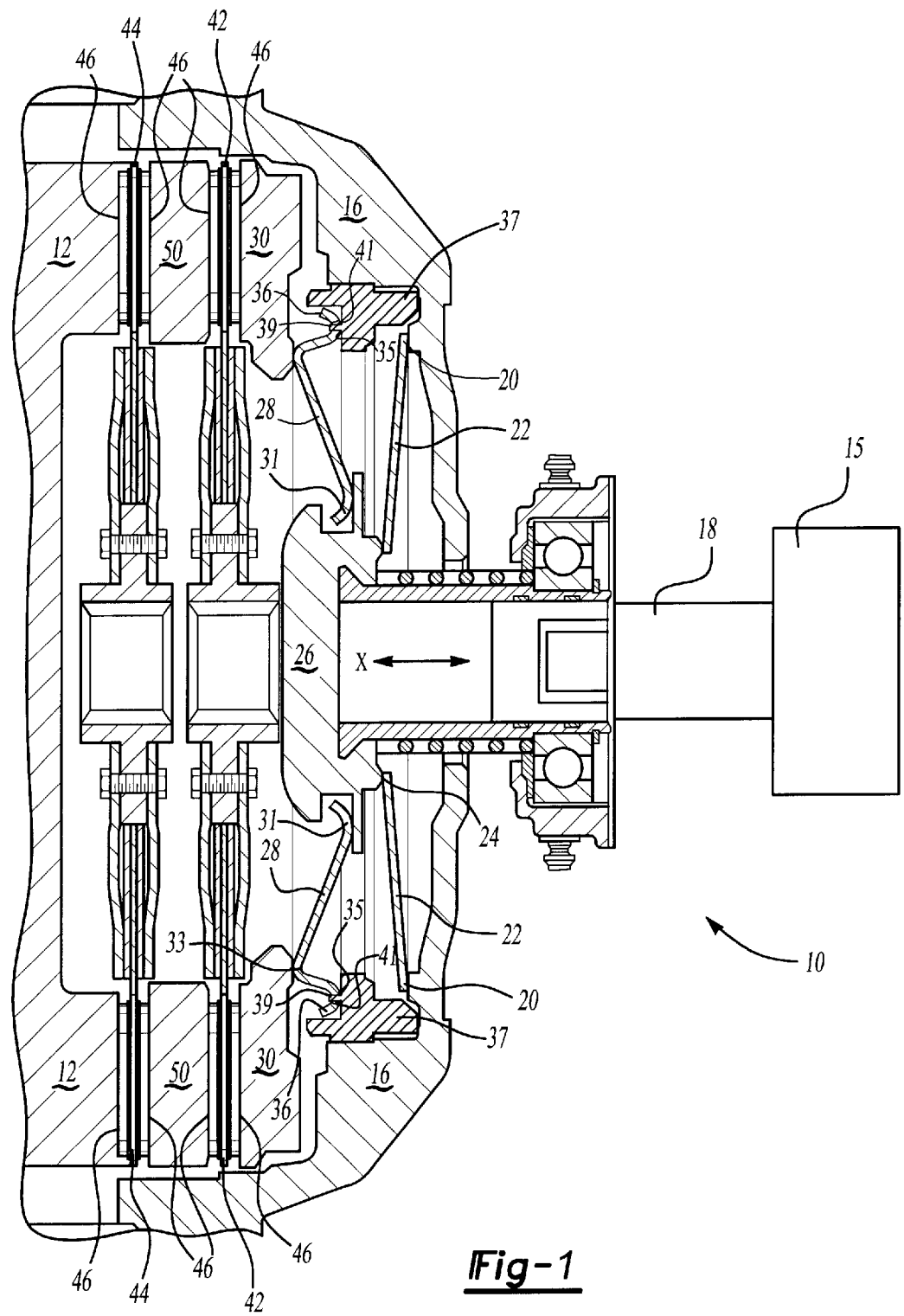
FIG. 1 illustrates the clutch in the engaged position.

The clutch 10 of the present invention is illustrated in FIG. 1 in an engaged position. The clutch 10 having rotational axis X selectively transmits rotation between a flywheel 12 of a drive engine and a transmission 15.

A clutch cover 16 encloses the clutch 10. An outer end 20 of a diaphragm spring 22 is positioned on the clutch cover 16, and an inner portion 24 of the diaphragm spring 22 is located on a retainer 26. A plurality of clutch levers 28 multiply the force of the diaphragm spring 22 on the retainer 26 and transmit the force to the pressure plate 30. Although only one clutch lever 28 is illustrated, there are preferably three to six clutch levers 28 positioned around a rotatable input shaft 18 of the transmission 15.

The clutch levers 28 are positioned in the clutch 10 such that an inner portion 31 is received in retainer 26 and an intermediate portion 33 is pressed against the pressure plate 30. An outer portion 36 of the clutch lever 28 includes a slot 41 which is pivotally received on a perch 39 on an adjusting ring 37. The clutch lever 28 pivots on the perch 39 about a pivot point 35.

The clutch 10 further includes first 44 and second clutch discs 42 which rotate with the input shaft 18. Second clutch disc 42 is positioned proximate to the pressure plate 30 and first clutch disc 44 is positioned proximate to the flywheel 12. An intermediate plate 50 secured to the clutch cover 16 is positioned between the clutch discs 42 and 44. Friction surfaces 46 are positioned between pressure plate 30, second clutch disc 42, intermediate plate 50, first clutch disc 44 and the flywheel 12.

Over time as the clutch 10 engages and disengages, the friction surfaces 46 wear, moving the pressure plate 30 farther from the intermediate portion 33 of the clutch lever 28. When wear is detected, an adjuster ring 37 attached to the clutch cover 16 axially moves in the X direction towards the pressure plate 30, moving the pivot point 35 and the intermediate portion 33 of the clutch lever 28 towards the pressure plate 30 and maintaining the position of the clutch lever 28.

When the engine and the transmission 15 are engaged, the flywheel 12 rotates with the input shaft 18 of the transmission 15. When the clutch 10 is engaged, the clutch levers 28 press on the pressure plate 30 so that the friction surfaces 46 engage adjacent friction surfaces 46. In the engaged state, the flywheel 12 rotates with the rotatable clutch discs 42 and 44.

Figure 2:
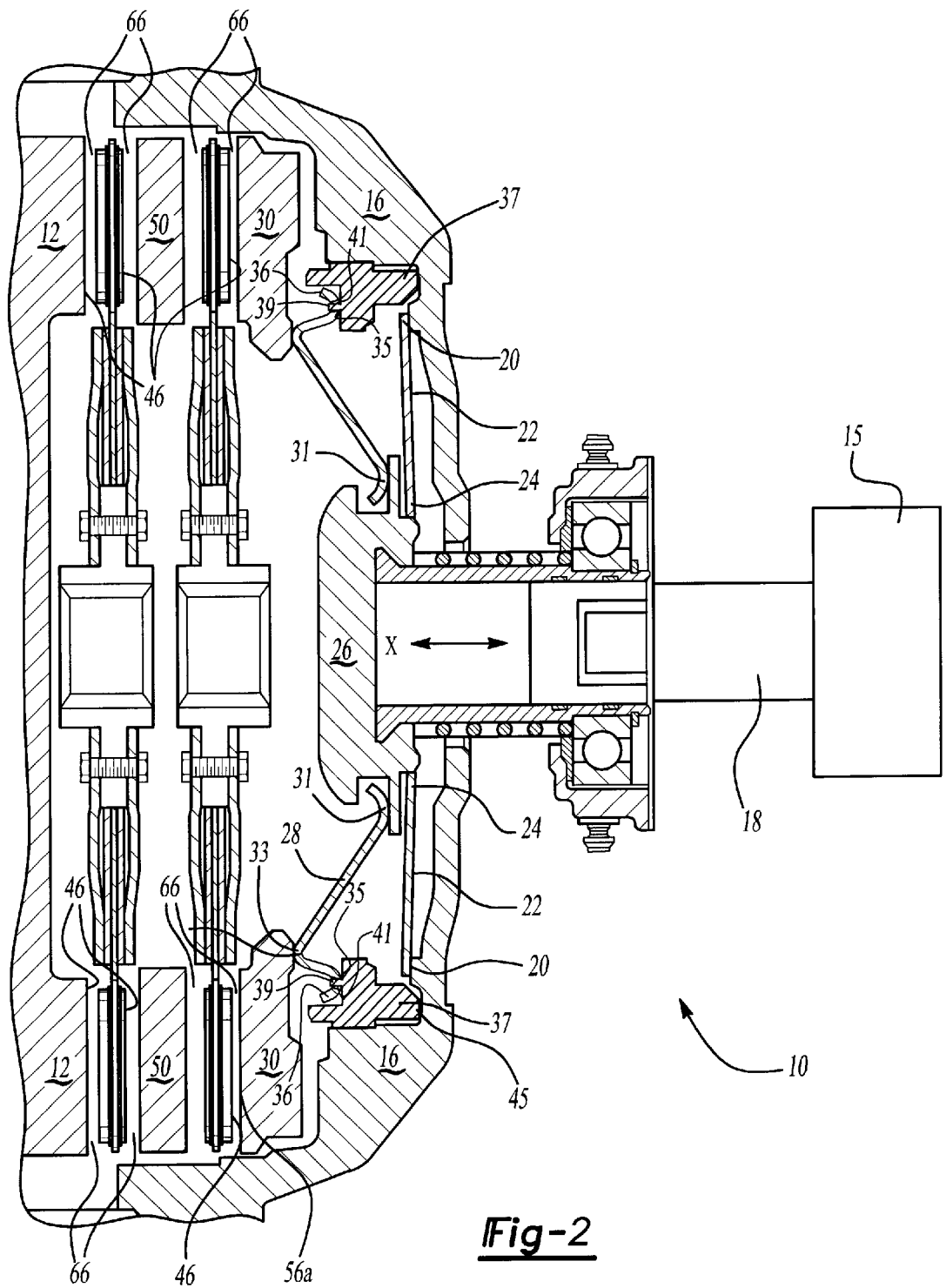
FIG. 2 illustrates the clutch in the disengaged position.

When a clutch pedal in the vehicle is pressed by the vehicle operator, the clutch 10 moves to the disengaged state, as illustrated in FIG. 2. The retainer 26 moves towards the transmission 15, the diaphragm spring 22 providing resistance to this movement. As the retainer 26 moves towards the transmission 15, the clutch levers 28 pivot about the outer point 36, releasing pressure on the pressure plate 30. The pressure plate 30 is lifted by straps from the second clutch disc 42, creating gaps 66 between all friction surfaces 46. Because of the gaps 66, the clutch discs 42 and 44 do not rotate with the flywheel 12 and torque is not transmitted from the engine to the transmission 15.

The clutch lever 28 of the present invention is illustrated in FIGS. 4 and 5 and provides a force to the pressure plate 30 proportional to a lever ratio LR. A proper lever ratio LR selection is important for good clutch performance. An intermediate center of curvature 34 could be defined positioned at the same level as the point of contact 68 of the intermediate portion 33 and the pressure plate 30, and an inner center of curvature 32 could be defined positioned at the same level as the point of contact 70 of the inner portion 31 and the retainer 26. The lever ratio LR is defined by the radial distance A from the inner center of curvature 32 to the outer point 36 divided by the radial distance B from the intermediate center of curvature 34 to the outer point 36, or A/B.

The intermediate center of curvature 34 remains at the same level as the point of contact 68 of the intermediate portion 33 and the pressure plate 30 during movement of the clutch lever 28. The inner center of curvature 32 remains at the same level as the point of contact 70 of the inner point 31 and the retainer 26 during movement of the clutch lever 28. That is, the center of curvatures 34 and 32 are the points which remain aligned with the points of contact 68 and 70 of the clutch lever 28 and the pressure plate 30 and retainer 26, respectfully, during operation of the clutch 10.

The lever ratio LR must be large enough to create an acceptable clamp load and to transmit torque between the engine and the transmission 15 and to create an acceptable clamp load. However, if the lever ratio LR is too large, there is less clearance, or clutch lift, between the pressure plate 30 and the flywheel 12, increasing the probability of clutch drag. Clamp load is generally prioritized over clutch lift.

In prior clutch assemblies 110, the clutch lever 128, illustrated in FIG. 3, has a lever shape angle equal to zero. The clutch lever 128 pivots about an outer center of curvature 136. An intermediate center of curvature 134 could be defined positioned on the same level as the point of contact 168 of the intermediate portion 133 and the pressure plate 130. An inner center of curvature 132 is received in the retainer 126. As shown in FIG. 3, the inner center of curvature 132, the intermediate fulcrum point 134 and the outer center of curvature 136 are aligned, and the lever shape angle is zero. The lever ratio does not depend on the lever position and is constant.

The clutch lever 28 of the present invention shown in FIG. 4 has the lever shape angle C not equal to zero. The lever shape is defined by an angle C formed by the line extending from the outer point 36 to the intermediate center of curvature 34 and the line extending from the outer point 36 to the inner center of curvature 32. As the points 32, 34 and 36 are not aligned, the lever shape angle C does not equal zero. It is preferred that the lever shape angle C be in the range of 10° to 30°, and preferably 20°. The lever shape angle C of the clutch lever 28 is constant. However, other lever shape angle C are possible, and a person of ordinary skill in the art can select the lever shape angle C of the clutch levers 28 according to clutch 10 requirements.

When the clutch lever 28 is in the engaged position illustrated in FIG. 4, the lever ratio LR should be relatively large. When the lever ratio LR is larger, there is a larger clamp load and a greater torque is transmitted. As the clutch lever 28 moves into the disengaged position as illustrated in FIG. 5, the clutch lever 28 pivots about outer point 36 and lever position angle D increases. The lever position is defined as the angle D formed by the line extending from the outer point 36 to the inner center of curvature 32 and a line extending substantially parallel to a rotational axis Y of the clutch discs 42 and 44. As the lever position D changes, either by movement of the clutch lever 28 or because of wear of the clutch levers 28, the lever ratio LR changes. It is preferred that the lever position angle D increase by 10° to 15°, preferably 12°, when the clutch lever 28 moves from the engaged position to the disengaged position. However, it is to be understood that the lever position angle D can increase by any degree necessary to move the clutch lever 28 from the engaged position to the disengaged position.

In the present invention, when the clutch lever 28 moves into the disengaged position illustrated in FIG. 5, distance A decreases in length and distance B increases in length, decreasing the lever ratio LR. Additionally, the lever position D increases. In the disengaged position, the pressure plate lift increases, allowing for more clearance between the pressure plate 30 and flywheel 12, minimizing clutch drag.

There are several advantages to using the clutch lever 28 of the present invention. For one, a variable lever ratio LR is possible by changing lever position D. This allows for both clamp load and clutch lift to be maximized. When the clutch 10 is engaged, the lever ratio LR is larger, allowing for larger clamp load. When the clutch 10 is disengaged, the lever ratio LR is smaller, allowing for larger clutch lift. Finally, both the lever shape angle C and the lever position angle D can be selected for optimal results. Additionally, these conditions exist during the entire lift of the clutch 10.

Accordingly, the present invention provides a clutch lever with a lever ratio that varies during movement of the clutch lever to maximize both clamp load and clutch lift.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specially described. For that reason the following claims should be studied to determine the true scope and content of this invention.

What is claimed is:

1. A clutch assembly comprising:
   at least one clutch disc to be selectively brought into and out of engagement;
   a moveable pressure plate to selectively squeeze said at least one clutch disc into and out of engagement; and a plurality of pivotable clutch levers to selectively cause said pressure plate to move;

said clutch levers being structured to have a lever ratio of said clutch levers that varies as said clutch levers pivot wherein when said clutch levers pivot and cause said pressure plate to be squeezed against said clutch disc, said lever ratio and thus a clamping force applied by said clutch levers is higher than said clutch lever ratio present at a disengaged position wherein said clutch disc is disengaged, thereby enabling said clutch levers to maximize both the clamping force while said clutch disc is engaged and to maximize clutch lift clearance when said clutch disc is disengaged.

2. The clutch assembly as recited in claim 1, wherein said lever ratio varies as a lever position of said clutch lever varies.

3. The clutch assembly as recited in claim 1, wherein said lever ratio decreases as said clutch levers pivot from an engaged position to a disengaged position.

4. The clutch assembly as recited in claim 1, wherein an outer point of each of said clutch levers is pivotally received in an adjuster ring and an intermediate portion of each of said clutch levers contacts said pressure plate to selectively cause said pressure plate to move.

5. The clutch assembly as recited in claim 4, wherein said adjuster ring moves towards said pressure plate as said pressure plate and said at least one clutch disc wears, said adjuster ring moving said outer portion of each of said clutch levers towards said pressure plate.

6. The clutch assembly as recited in claim 4, wherein said intermediate portion of each of said clutch levers presses said pressure plate into engagement with said at least one clutch disc when said clutch levers are in an engaged position, and said intermediate portion of each of said clutch levers releases said pressure plate from engagement with said at least one clutch disc when said clutch levers are in a disengaged position.

7. The clutch assembly as recited in claim 4, wherein an inner portion of each of said clutch levers is received in a retainer, and axial movement of said retainer pivots said clutch levers about said outer point.

8. The clutch assembly as recited in claim 7, wherein an inner center of curvature positioned on a same level as an inner point of contact of said inner portion and said retainer, an intermediate center of curvature positioned on a same level as an intermediate point of contact of said intermediate portion of said pressure plate, and said outer point are not aligned.

9. The clutch assembly as recited in claim 8, wherein said inner center of curvature and said intermediate center of curvature are aligned with said inner point of contact and said intermediate point of contact, respectively, during operation of said clutch to be substantially parallel to a rotational axis of said clutch.

10. The clutch assembly as recited in claim 8, wherein a lever shape is defined by a lever angle formed by a line extending from said outer point to said intermediate center of curvature and a line extending from said outer point to said inner center of curvature.

11. The clutch assembly as recited in claim 10, wherein said lever angle is approximately between 10° and 30°.

12. The clutch assembly as recited in claim 8, wherein said lever ratio is defined by a distance between said outer point and said inner center of curvature, divided by a distance between said outer point and said intermediate center of curvature, said distance between said outer point and said inner center of curvature decreasing, and said distance between said outer point and said intermediate center of curvature increasing, as said clutch levers pivot between said engaged and disengaged positions, said distances being measured in a direction extending radially.

13. A clutch assembly comprising:

a clutch cover;

a rotatable input shaft;

an axially moveable retainer connected to said input shaft;

at least one clutch disc to be selectively brought into and out of engagement;

a moveable pressure plate to selectively squeeze said at least one clutch disc into and out of engagement; and a plurality of pivotable clutch levers positioned between said retainer and said pressure plate to selectively cause said pressure plate to move, and structured so that axial movement of said retainer pivots each of said plurality of clutch levers between an engaged position in which said clutch levers press said pressure plate into engagement with said plurality of clutch discs to transmit rotation between a transmission and engine, and a disengaged position in which said clutch levers release said pressure plate from engagement with said plurality of said clutch discs to disengage rotation between said transmission and said engine, wherein a lever ratio of said clutch levers varies as said clutch levers pivot and wherein when said clutch levers pivot and cause said pressure plate to be squeezed against said clutch disc, said lever ratio and thus a clamping force applied by said clutch levers is higher than said clutch lever ratio present at a disengaged position wherein said clutch disc is disengaged, thereby enabling said clutch levers to maximize both the clamping force while said clutch disc is engaged and to maximize clutch lift clearance when said clutch disc is disengaged.

14. The clutch assembly as recited in claim 13, wherein there are from three to six clutch levers in said clutch assembly.

15. The clutch assembly as recited in claim 13, wherein said lever ratio varies as a lever position of said clutch varies.

16. The clutch assembly as recited in claim 13, wherein said lever ration decreases as said clutch levers pivot from an engaged position to a disengaged position.

17. The clutch assembly as recited in claim 13, wherein an outer point of each of said clutch levers is pivotally received in an adjuster ring and an intermediate portion of each of said clutch levers contacts said pressure plate to selectively cause said pressure plate to move.

18. The clutch assembly as recited in claim 17, wherein said adjuster ring moves towards said pressure plate as said pressure plate and said at least one clutch disc wears, said adjuster ring moving said outer portion of each of said clutch levers towards said pressure plate.

19. The clutch assembly as recited in claim 17, wherein said intermediate portion of each of said clutch levers presses said pressure plate into engagement with said at least one clutch disc, when said clutch levers are in said engaged position, and said intermediate portion of each of said clutch levers releases said pressure plate from engagement with said at least one clutch disc, when said clutch levers are in said disengaged position.

20. The clutch assembly as recited in claim 17, wherein an inner portion of each of said clutch levers are received in said retainer, and axial movement of said retainer pivots said clutch levers about said outer point.

21. The clutch assembly as recited in claim 20, wherein an inner center of curvature positioned on a same level as an inner point of contact of said inner portion and said retainer, an intermediate center of curvature position on a same level as an intermediate point of contact of said intermediate portion and said pressure plate, and said outer point, are not aligned.

22. The clutch assembly as recited in claim 21, wherein said inner center of curvature and said intermediate center of curvature are aligned with said inner point of contact and said intermediate point of contact, respectively, during operation of said clutch, to be substantially parallel to a rotational axis of said clutch.

23. The clutch assembly as recited in claim 21, wherein a lever shape is defined by a lever angle formed by a line extending from said outer point to said inner center of curvature, and said lever angle is approximately between 10° and 30°.

24. A clutch assembly as recited in claim 21, wherein said lever ratio is defined by a distance between said outer point and said inner center of curvature, divided by a distance between said outer point and said intermediate center of curvature, said distance between said outer point and said inner center of curvature decreasing, and said distance between said outer point and said intermediate center of curvature increasing, as said clutch levers pivot between said engaged and disengaged positions, said distances being measured in a direction extending radially.

* * * * *